US011485125B2

(12) United States Patent
Dong

(10) Patent No.: US 11,485,125 B2
(45) Date of Patent: Nov. 1, 2022

(54) METHOD FOR COATING GUM OF SELF-ADHESIVE MAT WITH SPACED-APART GUM

(71) Applicant: NINGBO HUIDUO WEAVING CO., LTD., Ningbo (CN)

(72) Inventor: Haizhou Dong, Ningbo (CN)

(73) Assignee: NINGBO HUIDUO WEAVING CO., LTD., Ningbo (CN)

( * ) Notice: Subject to any disclaimer, the term of this patent is extended or adjusted under 35 U.S.C. 154(b) by 158 days.

(21) Appl. No.: 16/926,527

(22) Filed: Jul. 10, 2020

(65) Prior Publication Data
US 2021/0138780 A1 May 13, 2021

(30) Foreign Application Priority Data
Nov. 8, 2019 (CN) .......................... 201911087345.4

(51) Int. Cl.
| | | |
|---|---|---|
| *B32B 37/15* | (2006.01) | |
| *B29C 48/08* | (2019.01) | |
| *B29C 48/28* | (2019.01) | |
| *B29C 48/00* | (2019.01) | |
| *B32B 37/00* | (2006.01) | |
| *B32B 37/12* | (2006.01) | |
| *C08L 53/02* | (2006.01) | |
| *B29K 9/06* | (2006.01) | |
| *B29K 23/00* | (2006.01) | |
| *B29K 105/00* | (2006.01) | |

(52) U.S. Cl.
CPC ........ *B32B 37/153* (2013.01); *B29C 48/0021* (2019.02); *B29C 48/08* (2019.02); *B29C 48/28* (2019.02); *B32B 37/0053* (2013.01); *B32B 37/12* (2013.01); *C08L 53/02* (2013.01); *B29K 2009/06* (2013.01); *B29K 2023/12* (2013.01); *B29K 2105/0044* (2013.01); *B29K 2713/00* (2013.01); *B32B 2305/20* (2013.01); *B32B 2367/00* (2013.01); *C08L 2205/03* (2013.01)

(58) Field of Classification Search
CPC .. C09J 153/025; C09D 153/025; B32B 37/12; B32B 2367/00; B32B 37/0053; B32B 2305/20; B32B 37/153; C08L 2205/03; C08L 53/02; C08L 91/06; C08L 23/12; B29C 48/08; B29C 48/21; B29C 48/92; B29C 48/154; B29C 48/022; B29C 48/28; B29C 48/0021; B29K 2105/0044; B29K 2023/12; B29K 2713/00; B29K 2009/06; C08K 3/26

See application file for complete search history.

(56) References Cited

U.S. PATENT DOCUMENTS

| | | | | |
|---|---|---|---|---|
| 2008/0210366 A1* | 9/2008 | Chen | ...................... | B29C 66/727 156/182 |
| 2011/0039051 A1* | 2/2011 | Flowers, Jr. | ........... | B60N 3/048 112/475.08 |
| 2011/0305886 A1* | 12/2011 | Phan | ....................... | C08L 57/02 524/505 |

\* cited by examiner

*Primary Examiner* — Vishal I Patel
(74) *Attorney, Agent, or Firm* — Jiwen Chen

(57) ABSTRACT

The present invention discloses a method for coating gum of self-adhesive mat with spaced-apart gum, using a mat body, gum layers being spaced apart on a bottom surface of the mat body, including the following steps of: weighing raw materials of components in a determined proportion, stirring uniformly by a stirrer that supplies hot air for dehumidification, conveying the mixture to an extruder through a screw, thermally melting by the screw extruder, extruding from rectangular discharge ports formed at intervals on the extruder and vertically falling onto an upper roller (the roller surface is a smooth surface) of a rolling and combining device, passing a mat body from an unwinding device to a lower roller of the rolling and combining device, rolling the mat body by adjusting a gap between the upper and lower rollers by a lead screw, forming self-adhesive gum layers, which are spaced apart from each other, on the back of the mat body. The gum using hydrogenated styrene-butadiene block copolymer (SEBS) as a main raw material coating on the bottom surface. According to the present invention, the gum is able to adequately adsorb the mat onto the floor due to its good flexibility, and allow the mat to move without affecting the adsorption effect due to its good detachability. Meanwhile, the mat is non-toxic and environmentally friendly, can be washed repeatedly without affecting its self-adhesive adsorption effect and can be reused. It is of great significance for the development of mats.

9 Claims, No Drawings

METHOD FOR COATING GUM OF SELF-ADHESIVE MAT WITH SPACED-APART GUM

This application claims the priority benefit of Chinese Application No. 2019110873454, filed Nov. 8, 2019, which is hereby incorporated by reference.

TECHNICAL FIELD OF THE INVENTION

The present invention relates to a method for manufacturing a floor mat, in particular, a method for coating gum of self-adhesive mat with spaced-apart gum.

BACKGROUND OF THE INVENTION

Nowadays, with the increasing requirements for the quality of life, floors in many families or public places are shiny and beautiful. However, shiny floors are slippery, and people are prone to fall down. Therefore, mats are often placed on floors or stairs to avoid slip accidents and improve the softness and beauty of floors. However, due to insufficient adhesion between conventional mats and floors, slippage may still occur between the mat and the floor, particularly in toilets with water on the floor. In order to solve this problem, at present, PVC, latex and TPR material layers are arranged on the back of the mat facing the floor. However, practice shows that the PVC, latex and TPR material layers are not resistant to high temperature and aging, and they are carcinogenic and are not environmentally friendly since the plasticizers, aqueous ammonia and chemical fiber modified materials used during the production of PVC, latex and TPR will produce toxic and harmful substances. Therefore, in the current market, there is an urgent need for an innovative product that is environmentally friendly and effective in slip resistance and durability, in order to solve the problems on slip resistance, safety and environmental protection of mats.

SUMMARY OF THE INVENTION

In order to solve the above technical defects, an object of the present invention is to provide a method for coating gum of self-adhesive mat with spaced-apart gum, which is resistant to high temperature and aging, environmentally friendly, non-toxic, good in self-adhesion effect, and free of chemical reaction with floor materials, and which can be washed repeatedly with water while maintaining the self-adhesion effect.

For this purpose, the present invention provides a method for coating gum of self-adhesive mat with spaced-apart gum, using a mat body, gum layers being spaced apart on a bottom surface of the mat body, comprising the following steps of: weighing raw materials of components in a determined proportion, stirring uniformly by a stirrer that supplies hot air for dehumidification, conveying the mixture to an extruder through a screw, thermally melting by the screw extruder, extruding from rectangular discharge ports formed at intervals on the extruder and vertically falling onto an upper roller (the roller surface is a smooth surface) of a rolling and combining device, passing a mat body from an unwinding device to a lower roller of the rolling and combining device, rolling the mat body by adjusting a gap between the upper and lower rollers by a lead screw, forming self-adhesive gum layers, which are spaced apart from each other, on the back of the mat body, laminating a PET dustproof film on the gum layers, and finally winding the mat body, wherein the thermal melting temperature in the extruder is 170° C. to 190° C., the rotation speed of the extruder screw is 50 to 60 revolutions per minute, the gap between the upper and lower rollers of the combining device has a value of X which is equal to the thickness of the mat body plus the thickness of the gum layer. The gum using hydrogenated styrene-butadiene block copolymer (SEBS) as a main raw material coating on the bottom surface. The gum layers, which are spaced apart from each other, are coated on the bottom surface of the mat body in a geometric pattern.

The gum layers, which are spaced apart from each other, are coated on the bottom surface of the mat body in a geometric pattern. As long as the coating thinness of the gum layers is 0.01 mm to 10 mm, the self-adhesion can be realized. Experiments show that, when the coating thickness of the gum layers is 0.08 mm to 3.0 mm, the self-adhesion effect is the best, the cost is the lowest, and the defective rate is the lowest.

Here, the mat body may be a mat body formed by flocking fiber yarns on a non-woven fabric, and the gum layers are rolled and coated on the back of the non-woven fabric. The mat body may also be woven fabrics or other flocked products or other composite materials.

The self-adhesive gum layers, which are spaced apart from each other, comprises the following components in parts by weight: 44 to 50 parts of hydrogenated styrene-butadiene block copolymer (SEBS), 36 to 44 parts of paraffin oil, 0.5 to 2 parts of polypropylene (PP), 1 to 5 parts of activated calcium carbonate, and 1 to 5 parts of thermal stabilizer. Here, the hydrogenated styrene-butadiene block copolymer is excellent in flexibility, elasticity and adhesion.

Compared with the conventional use of PVC, latex and TPR as raw materials, in the present invention, the hydrogenated styrene-butadiene block copolymer (SEBS) thermoplastic elastomer is used as a raw material, so that the high-temperature resistance, aging resistance, oxidation resistance and durability are realized. Moreover, during the production and recovery process, no toxic substances will be produced, so that the environmental protection is realized.

Meanwhile, due to the addition of paraffin oil and activated calcium carbonate, the flexibility of the produced gum is improved, and the gum better adheres the mat to the floor. Moreover, in the present invention, by setting the proportion by weight of the raw materials, the utilization of the raw materials during the production is improved, and the waste of the raw materials is avoided; and, the self-adhesion of the gum is improved, and the produced gum has good toughness and high self-adhesion and adhesion.

In summary, compared with the prior art, the present invention has the following advantages. The gum produced by using SEBS as a main raw material is coated on the bottom surface, so the mat is long in service life, high in slip resistance, high in water permeability and resistant to mildew and odor, high in stability, and less chemically reactive with the floor materials (floor boards or floor tiles), and wide in application range. The mat is non-toxic and environmentally friendly during the production, use and recovery process, can be washed repeatedly without affecting its self-adhesive adsorption effect and can be reused. The mat is economical and practical, satisfies the market requirements and is suitable for popularization.

DETAILED DESCRIPTION OF THE INVENTION

The present invention will be further described below by embodiments.

Embodiment 1

This embodiment provides method for coating gum of a self-adhesive mat with spaced-apart gum, using a mat body. Gum layers are spaced apart on a bottom surface of the mat body. The gum in the gum layers, which are spaced apart from each other, consists of the following components in parts by weight: 50 parts of hydrogenated styrene-butadiene block copolymer (SEBS), 44 parts of paraffin oil, 0.5 parts of polypropylene (PP), 1 part of activated calcium carbonate, and 1 part of thermal stabilizer. A method for producing the gum includes the following steps of: weighing raw materials of components in a determined proportion, stirring uniformly by a stirrer that supplies hot air for dehumidification, conveying the mixture to an extruder through a screw, thermally melting by the screw extruder, extruding from rectangular discharge ports formed at intervals on the extruder and vertically falling onto an upper roller (the roller surface is a smooth surface) of a rolling and combining device, passing the mat body from an unwinding device to a lower roller of the rolling and combining device, rolling the mat body by adjusting a gap between the upper and lower rollers by a lead screw, forming self-adhesive gum layers, which are spaced apart from each other, on the back of the mat body, laminating a PET dustproof film on the gum layers, and finally winding the mat body, wherein the thermal melting temperature in the extruder is 170° C. to 190° C., and the rotation speed of the extruder screw is 50 to 60 revolutions per minute. Here, in this embodiment, the mat body may be a mat body formed by flocking fiber yarns on a non-woven fabric, and the gum layers are rolled and coated on the back of the non-woven fabric. The mat body may also be woven fabrics or other flocked products or other composite materials.

Test 1: Self-Adhesion Test

Information about the tested products:

Self-adhesive mat with spaced-apart gum (A): quantity: 1; specification: 40 cm*60 cm; material: polyester on the front or top surface and self-adhesive gum on the back or bottom; pattern on the back or bottom: spaced-apart stripes each having a width of 1.2 cm, with a gap 1.2 cm therebetween; and, coating thickness: 1.0 mm.

Mat full of anti-slip layers on its back (B): quantity: 1; specification: 40 cm*60 cm; material: polyester on the front or top surface and latex on the back or bottom; and, pattern on the back or bottom: fully-filled and all over the back or bottom, coating thickness: 1.0 mm.

First group: the mats A and B were spread on the wood floor without any heavy object thereon, and one side of each mat was pulled by a horizontal tensiometer for friction test; then, in the same environment, after the mats A and B were spread on the wood floor, the same volume of water was sprinkled on each mat and around it, and the above test process was repeated.

Second group: the mats A and B were spread on the tile floor without any heavy object thereon, and one side of each mat was pulled by a horizontal tensiometer for friction test; then, in the same environment, after the mats A and B were spread on the tile floor, the same volume of water was sprinkled on each mat and around it, and the above test process was repeated.

The test data was shown below: (friction unit: N)

TABLE 1

| | Slip resistance N | | | |
|---|---|---|---|---|
| Type | Wood floor (dry) | Wood floor (wet) | Tile floor (dry) | Tile floor (wet) |
| Self-adhesive mat with spaced-apart gum (A) | 28.3 | 29.1 | 33.7 | 35.9 |
| Mat full of anti-slip layers on its back (B) | 2.5 | 2.9 | 2.3 | 6.1 |

By the comparison of the test data, it could be known that, when there was no water or some water on the floor, the mat A had stable slip resistance. The test data of the two groups showed that the slip resistance of the self-adhesive mat with spaced-apart gum (A) was obviously better than that of the mat full of anti-slip layers on its back (B). It is normal that there is some water on the mat in real life. The self-adhesive mat with spaced-apart gum (A) according to the present invention can provide a safer, more convenient and more practical product for people's life.

Test 2: self-Adhesion Test After Washing

Information about the tested product:

Self-adhesive mat with spaced-apart gum (a): quantity: 1; specification: 40 cm*60 cm; material: polyester on the front or top surface and self-adhesive gum on the back or bottom; pattern on the back or bottom: spaced-apart stripes each having a width of 1.2 cm, with a gap 1.2 cm therebetween; and, coating thickness: 1.2 mm.

Mat full of anti-slip layers on its back (b): quantity: 1; specification: 40 cm*60 cm; material: polyester on the front or top surface and latex on the back or bottom; and, pattern on the back or bottom: fully-filled and all over the back or bottom, coating thickness: 1.2 mm.

First group: the mats a and b were washed by the same type of household washing machines with neutral water at 20° C. in a conventional washing mode, and then hung to dry; this process was repeated for 10 times; then, the mats a and b were spread on the wood floor without any heavy object thereon, and one side of each mat was pulled by a horizontal tensiometer for friction test. Subsequently, in the same environment, the mats a and b were washed repeatedly for 30 times, and the above test process was repeated. Similarly, the mats a and b were washed repeatedly for 50 times and 60 times for slip resistance test. The test data was shown below.

TABLE 2

| | Slip resistance | | | |
|---|---|---|---|---|
| Type | 10 times | 30 times | 50 times | 60 times |
| Self-adhesive mat with spaced-apart gum (a) | Excellent | Good | Good | Fair |
| Mat full of anti-slip layers on its back (b) | Fair | Poor | Partially detached | Unusable |

Notes:
the friction is denoted by N, where N < 2 indicates poor slip resistance; 2 ≤ N < 10 indicates fair slip resistance; 10 ≤ N < 30 indicates good slip resistance; and 30 ≤ N indicates excellent slip resistance.

Second group: the mats a and b were washed by the same type of household washing machines with neutral water at 60° C. in a conventional washing mode, and then hung to dry after being washed repeatedly for 10 times; then, the mats a and b were spread on the wood floor without any heavy object thereon, and one side of each mat was pulled by a horizontal tensiometer for friction test. Subsequently, in the same environment, the mats a and b were washed repeatedly for 30 times, and the above test process was repeated. Similarly, the mats a and b were washed for 50 times and 60 times for slip resistance test. The test data was shown below.

TABLE 3

|  | Slip resistance | | | |
| --- | --- | --- | --- | --- |
| Type | 10 times | 30 times | 50 times | 60 times |
| Self-adhesive mat with spaced-apart gum (a) | Excellent | Good | Fair | Fair |
| Mat full of anti-slip layers on its back (b) | Poor | Partially detached | Unusable | / |

Notes:
the friction is denoted by N, where N < 2 indicates poor slip resistance; 2 ≤ N < 10 indicates fair slip resistance; 10 ≤ N < 30 indicates good slip resistance; and 30 ≤ N indicates excellent slip resistance.

By the comparison of the test data, it could be known that, with regard to the washability of the mats a and b, the washability and slip resistance of the self-adhesive mat with spaced-apart gum (a) were far higher than those of the mat full of anti-slip layers on its back (b). The self-adhesive mat with spaced-apart gum (a) could be washed repeatedly for multiple times while maintaining the self-adhesion performance, and stable in slip resistance and less prone to degumming. It was fully demonstrated that the self-adhesive mat with spaced-apart gum (a) according to the present invention had high-temperature resistance, aging resistance, oxidation resistance and durability.

Embodiment 2

This embodiment provides a method for coating gum of self-adhesive mat with spaced-apart gum, using a mat body. Gum layers are spaced apart on a bottom surface of the mat body. The gum in the gum layers, which are spaced apart from each other, comprise the following components in parts by weight: 44 parts of hydrogenated styrene-butadiene block copolymer (SEBS), 36 parts of paraffin oil, 1 part of polypropylene (PP), 2 parts of activated calcium carbonate, and 2 parts of thermal stabilizer. A method for producing the gum comprises the following steps of: weighing raw materials of components in a determined proportion, stirring uniformly by a stirrer that supplies hot air for dehumidification, conveying the mixture to an extruder through a screw, thermally melting by the screw extruder, extruding from rectangular discharge ports formed at intervals on the extruder and vertically falling onto an upper roller (the roller surface is a smooth surface) of a rolling and combining device, passing the mat body from an unwinding device to a lower roller of the rolling and combining device, rolling the mat body by adjusting a gap between the upper and lower rollers by a lead screw, forming self-adhesive gum layers, which are spaced apart from each other, on the back of the mat body, laminating a PET dustproof film on the gum layer, and finally winding the mat body, wherein the thermal melting temperature in the extruder is 170° C. to 190° C., and the rotation speed of the extruder screw is 50 to 60 revolutions per minute. By adjusting the height of the rollers, the thickness of the coated gum is 0.08 mm, 0.5 mm, 1.0 mm, 2.0 mm and 3.0 mm, respectively. The gum layers, which are spaced apart from each other, are coated on the bottom surface of the mat body in multiple patterns, where each pattern has a width of 1 mm and the gap between patterns is 1 mm. In this embodiment, the mat body is a composite product of a woven fabric and a non-woven fabric, and the gum layers are coated on the back of the non-woven fabric. The self-adhesive mat with spaced-apart gum obtained in this embodiment is tested as below.

Test 3: Test of the Thickness of the Self-Adhesive Gum and the Self-Adhesion Performance Information about the tested product: the self-adhesive mat with spaced-apart gum obtained in Embodiment 2 was used: quantity: 1; specification: 40 cm*60 cm; material: polyester on the front or top surface self-adhesive gum on the back or bottom; pattern on the back or bottom: spaced-apart stripes.

During the production, by adjusting the height of the rollers, the thickness of the gum coated on the mat was set as 0.08 mm, 0.5 mm, 1.0 mm, 2.0 mm and 3.0 mm, respectively. Then, the mat was spread on the wood floor and the tile floor without any heavy object thereon, and one side of the mat was pulled by a horizontal tensiometer to test the slip resistance of the self-adhesive mat. The dry and wet tests were conducted by the method as described in Test 1. The test data was shown below.

TABLE 4

| | Self-adhesion performance Test of the thickness of the spaced-apart self-adhesive gum and the slip resistance | | | |
| --- | --- | --- | --- | --- |
| Coating thickness | Wood floor (dry) | Tile floor (dry) | Wood floor (wet) | Tile floor (wet) |
| <0.1 mm | When the actually measured thickness of the gum is less than 0.1 mm, it is likely to result in more than 50% defective products. | | | |
| 0.08 mm | Good | Good | Good | Good |
| 0.5 mm | Excellent | Excellent | Good | Good |
| 1.0 mm | Excellent | Excellent | Excellent | Excellent |
| 2.0 mm | Excellent | Excellent | Good | Good |
| 3.0 mm | Good | Good | Good | Good |

Notes:
the friction is denoted by N, where N < 2 indicates poor slip resistance; 2 ≤ N < 10 indicates fair slip resistance; 10 ≤ N < 30 indicates good slip resistance; and 30 ≤ N indicates excellent slip resistance.

It could be known from the above test data that, for the self-adhesive mat with spaced-apart gum, the thickness of the self-adhesive gum and the slip resistance showed a distribution of "poor at two ends and excellent in the middle". Thus, it would be optimal that the thickness of the self-adhesive gum was 1.0 mm.

Test 4: Washability Test of the Self-Adhesive Gum in Multiple Patterns

Information about the tested product: the self-adhesive mat with spaced-apart gum obtained in Embodiment 2 was used: quantity: 1; specification: 40 cm*60 cm; material: polyester on the front or top surface and self-adhesive gum on the back or bottom; the thickness of the gum: 1.0 mm; the gap between rollers: 3.3; and, the moment of force is the same.

TABLE 5

| The number of washing times | Gum pattern | | | |
|---|---|---|---|---|
| | Spaced-apart stripes | Spaced-apart circles | Individual rectangles | Individual triangles |
| 1 | Not degummed | Not degummed | Not degummed | Not degummed |
| 2 | Not degummed | Not degummed | Not degummed | Not degummed |
| 3 | Not degummed | Not degummed | Not degummed | Partially degummed |
| 4 | Not degummed | Not degummed | Partially degummed | Partially degummed |
| 5 | Not degummed | Not degummed | Partially degummed | Partially degummed |
| 6 | Not degummed | Partially degummed | Partially degummed | Degummed |
| 7 | Not degummed | Partially degummed | Partially degummed | Degummed |
| 8 | Not degummed | Partially degummed | Degummed | Degummed |
| 9 | Not degummed | Partially degummed | Degummed | Degummed |
| 10 | Not degummed | Partially degummed | Degummed | Degummed |
| 11 | Not degummed | Degummed | Degummed | Degummed |
| 12-49 | Not degummed | Degummed | Degummed | Degummed |
| 50 | Not degummed | Degummed | Degummed | Degummed |
| 51 | Not degummed | Degummed | Degummed | Degummed |
| 52 | Partially degummed | Degummed | Degummed | Degummed |

It could be known from the above test data that, by comparing the spaced-apart stripes with other spaced-apart patterns, the spaced-apart circles begun to degum after being washed for 6 times; the individual rectangles begun to degum after being washed for 4 times; the individual triangles begun to degum after being washed for 3 times; and the spaced-apart stripes were not degummed after being washed for 50 times. It was indicated that the spaced-apart stripes were optimal and had good adhesion and high durability.

Embodiment 3

This embodiment provides a method for coating gum of self-adhesive mat with spaced-apart gum, using a mat body. Gum layers are spaced apart on a bottom surface of the mat body. The gum in the gum layers, which are spaced apart from each other, consists of the following components in parts by weight: 50 parts of hydrogenated styrene-butadiene block copolymer (SEBS), 36 parts of paraffin oil, 1 part of polypropylene (PP), 5 parts of activated calcium carbonate, and 5 parts of thermal stabilizer. A method for producing the gum includes the following steps of: weighing raw materials of components in a determined proportion, stirring uniformly by a stirrer that supplies hot air for dehumidification, conveying the mixture to an extruder through a screw, thermally melting by the screw extruder, extruding from rectangular discharge ports formed at intervals on the extruder and vertically falling onto an upper roller (the roller surface is a smooth surface) of a rolling and combining device, passing the mat body from an unwinding device to a lower roller of the rolling and combining device (here, the mat body is a mat body formed by flocking fiber yarns on a non-woven fabric), rolling the mat body by adjusting a gap between the upper and lower rollers by a lead screw, and forming self-adhesive gum layers, which are spaced apart from each other, on the back of the mat body so that the gum layers are rolled and coated on the back of the non-woven fabric. A PET dustproof film is laminated on the gum layers, and the mat body is finally wound. The thermal melting temperature in the extruder is 170° C. to 190° C., and the rotation speed of the extruder screw is 50 to 60 revolutions per minute. The gum layers on the bottom surface of the mat body are distributed in spaced-apart stripes each having a width of 1.2 cm, with a gap 1.2 cm therebetween.

Test 5: Washability Test of the Self-Adhesive Gum in Multiple Thicknesses

Information about the tested product: the tested product is the self-adhesive mat with spaced-apart gum obtained in Embodiment 3; quantity: 1; specification: 40 cm*60 cm; material: polyester on the front or top surface and self-adhesive gum on the back or bottom; pattern on the back or bottom: spaced-apart stripes each having a width of 1.2 cm, with a gap 1.2 cm therebetween; the gap between rollers is correspondingly adjusted according to the thickness of the gum; and, the moment of force is the same.

TABLE 6

| The number of washing times | The thickness of the gum (mm) | | | |
|---|---|---|---|---|
| | 0.08-3.0 | 3.0-5.0 | 5.0-10.0 | above 10 |
| 1 | Not degummed | Not degummed | Not degummed | Not degummed |
| 2 | Not degummed | Not degummed | Not degummed | Not degummed |
| 3 | Not degummed | Not degummed | Not degummed | Not degummed |
| 4 | Not degummed | Not degummed | Not degummed | Not degummed |
| 5 | Not degummed | Not degummed | Not degummed | Partially gummed |
| 6 | Not degummed | Not degummed | Not degummed | Gummed |
| 7 | Not degummed | Not degummed | Partially gummed | / |
| 8 | Not degummed | Partially gummed | Gummed | / |
| 9 | Not degummed | Partially gummed | / | / |
| 10 | Not degummed | Partially gummed | / | / |
| 11 | Not degummed | Gummed | / | / |
| 12-49 | Not degummed | / | / | / |
| 50 | Not degummed | / | / | / |
| 51 | Partially gummed | / | / | / |
| 52 | Partially gummed | / | / | / |

It could be known from the above test data that there was a certain relationship between the thickness of the gum and the degumming. When the thickness of the gum was 0.08 to 3.0 mm, the adhesion was highest. With the increase of the thickness, the adhesion gradually decreased, the self-adhesion performance also decreased, and the material cost increased. Therefore, during the actual production, the product should be produced with the best effect and the lowest cost.

Test 6: Stability Test of the Self-Adhesive Gum

Information about the tested product: the tested product was the self-adhesive mat with spaced-apart gum (a) obtained in Embodiment 3; quantity: 1; specification: 40 cm*60 cm; material: polyester on the front or top surface and self-adhesive gum on the back or bottom; pattern on the back or bottom: spaced-apart stripes each having a width of 1.2 cm, with a gap 1.2 cm therebetween; and, coating thickness: 0.8 mm.

Mat full of anti-slip layers on its back (b): quantity: 1; specification: 40 cm*60 cm; material: polyester on the front or top surface, and latex on the back or bottom; and, pattern on the back or bottom: fully-filled and all over the back or bottom.

Test environment: a humidity of 90, a temperature of 60° C., and indoor wood floor.

First group: the mats a and b were spread on the wood floor with any heavy object thereon, and their reactions with the floor were observed after 48 hours, 72 hours, 96 hours and 120 hours, respectively. The test data was shown below.

TABLE 7

| Type | Slip resistance | | | |
| --- | --- | --- | --- | --- |
| | 48 H | 72 H | 96 H | 120 H |
| Self-adhesive mat with spaced-apart gum (a) | No reaction | No reaction | No reaction | No reaction |
| Mat full of anti-slip layers on its back (b) | No reaction | No reaction | No reaction | Slight reaction |

Notes:
the reaction is defined as follows: the change of the floor is observed visually, mainly including color, residual gum, formation of bubbles, etc.

It could be known from the above test data that, with regard to the stability of the mats a and b, the stability of the self-adhesive mat with spaced-apart gum (a) was far higher than that of the mat full of anti-slip layers on its back (b), and the self-adhesive mat with spaced-apart gum (a) did not react with the floor and is stable in slip resistance and less prone to degumming. It is fully demonstrated that the self-adhesive mat with spaced-apart gum (a) according to the present invention had high-temperature resistance, aging resistance, oxidation resistance and durability.

The invention claimed is:

1. A method for coating gum of self-adhesive mat with spaced-apart gum, using a mat body, self-adhesive gum layers being spaced apart on a bottom surface of the mat body, comprising the following steps of: weighing raw materials of components in a determined proportion, stirring uniformly by a stirrer that supplies hot air for dehumidification to form a mixture, conveying the mixture to an extruder through a screw, thermally melting by the extruder, extruding from rectangular discharge ports formed at intervals on the extruder and vertically onto an upper roller of a rolling and combining device, passing the mat body from an unwinding device to a lower roller of the rolling and combining device, rolling the mat body by adjusting a gap between the upper roller and the lower roller by a lead screw, forming self-adhesive gum layers, which are spaced apart from each other, on the back of the mat body, laminating a PET dustproof film on the gum layers, and finally winding the mat body, wherein the thermal melting temperature in the extruder is 170° C. to 190° C., the rotation speed of the extruder screw is 50 to 60 revolutions per minute, the gap between the upper roller and the lower roller of the combining device has a value of X which is equal to a thickness of the mat body plus a thickness of the gum layer; the gum using hydrogenated styrene-butadiene block copolymer (SEBS) as a main raw material coating on the bottom surface; the gum layers, which are spaced apart from each other, are coated on the bottom surface of the mat body in a geometric pattern.

2. The method for coating gum of self-adhesive mat with spaced-apart gum according to claim 1, wherein a coating thinness of the gum layers is 0.01 mm to 10 mm.

3. The method for coating gum of self-adhesive mat with spaced-apart gum according to claim 2, wherein the coating thinness of the gum layers is 0.08 mm to 3.0 mm.

4. The method for coating gum of self-adhesive mat with spaced-apart gum according to claim 1, wherein self-adhesive gum layers, which are spaced apart from each other, consists of the following components in parts by weight: 44 to 50 parts of hydrogenated styrene-butadiene block copolymer (SEBS), 36 to 44 parts of paraffin oil, 0.5 to 2 parts of polypropylene (PP), 1 to 5 parts of activated calcium carbonate, and 1 to 5 parts of thermal stabilizer.

5. The method for coating gum of self-adhesive mat with spaced-apart gum according to claim 1, wherein the mat body is a mat body formed by flocking fiber yarns on a non-woven fabric, and the gum layers are rolled and coated on the back of the non-woven fabric.

6. The method for coating gum of self-adhesive mat with spaced-apart gum according to claim 2, wherein self-adhesive gum layers, which are spaced apart from each other, consists of the following components in parts by weight: 44 to 50 parts of hydrogenated styrene-butadiene block copolymer (SEBS), 36 to 44 parts of paraffin oil, 0.5 to 2 parts of polypropylene (PP), 1 to 5 parts of activated calcium carbonate, and 1 to 5 parts of thermal stabilizer.

7. The method for coating gum of self-adhesive mat with spaced-apart gum according to claim 3, wherein self-adhesive gum layers, which are spaced apart from each other, consists of the following components in parts by weight: 44 to 50 parts of hydrogenated styrene-butadiene block copolymer (SEBS), 36 to 44 parts of paraffin oil, 0.5 to 2 parts of polypropylene (PP), 1 to 5 parts of activated calcium carbonate, and 1 to 5 parts of thermal stabilizer.

8. The method for coating gum of self-adhesive mat with spaced-apart gum according to claim 2, wherein the mat body is a mat body formed by flocking fiber yarns on a non-woven fabric, and the gum layers are rolled and coated on the back of the non-woven fabric.

9. The method for coating gum of self-adhesive mat with spaced-apart gum according to claim 3, wherein the mat body is a mat body formed by flocking fiber yarns on a non-woven fabric, and the gum layers are rolled and coated on the back of the non-woven fabric.

* * * * *